United States Patent
Booij et al.

(10) Patent No.: US 10,616,853 B2
(45) Date of Patent: Apr. 7, 2020

(54) LOCATION DETERMINATION USING ACOUSTIC-CONTEXTUAL DATA

(71) Applicant: SONITOR TECHNOLOGIES AS, Oslo (NO)

(72) Inventors: Wilfred Edwin Booij, Oslo (NO); Cyril Antille, Oslo (NO)

(73) Assignee: SONITOR TECHNOLOGIES AS, Oslo (NO)

( * ) Notice: Subject to any disclaimer, the term of this patent is extended or adjusted under 35 U.S.C. 154(b) by 0 days.

(21) Appl. No.: 15/858,893

(22) Filed: Dec. 29, 2017

(65) Prior Publication Data

US 2019/0208490 A1  Jul. 4, 2019

(51) Int. Cl.

| | |
|---|---|
| *H04W 64/00* | (2009.01) |
| *G01S 5/18* | (2006.01) |
| *G01S 19/48* | (2010.01) |
| *G01S 5/02* | (2010.01) |
| *G06F 16/29* | (2019.01) |

(52) U.S. Cl.
CPC .......... *H04W 64/00* (2013.01); *G01S 5/0263* (2013.01); *G01S 5/18* (2013.01); *G01S 19/48* (2013.01); *G06F 16/29* (2019.01)

(58) Field of Classification Search
CPC ............ G06Q 30/0261; G06Q 30/0267; G01S 19/39; G01S 3/80; G01S 5/02; G01S 5/18
See application file for complete search history.

(56) References Cited

U.S. PATENT DOCUMENTS

| | | | | |
|---|---|---|---|---|
| 9,606,250 B2* | 3/2017 | Hull | .................. | G01V 1/001 |
| 9,632,171 B1* | 4/2017 | Herold | .................. | G01S 5/20 |
| 9,983,293 B2* | 5/2018 | Farhadiroushan | ..... | G01H 9/004 |
| 10,104,484 B1* | 10/2018 | Bradford | .................. | G10L 25/51 |
| 10,111,034 B2* | 10/2018 | Johnson | .................. | H04W 64/00 |
| 2008/0151692 A1* | 6/2008 | Dijk | .................. | G01S 15/74 367/127 |

(Continued)

FOREIGN PATENT DOCUMENTS

| | | |
|---|---|---|
| WO | WO2010/084308 | 7/2010 |
| WO | WO2013/048708 | 4/2013 |

OTHER PUBLICATIONS

International Search Report and Written Opinion of the International Search Authority dated Apr. 5, 2019 for Appl. No. PCT/IB2018/060661, 20 pages.

*Primary Examiner* — Liton Miah

(74) *Attorney, Agent, or Firm* — Sterne, Kessler, Goldstein & Fox P.L.L.C.

(57) ABSTRACT

Systems and methods of determining a location of a mobile computing device associated with a real-time locating system are provided. For instance, a mobile computing device can determine a first location of the mobile computing device. The mobile computing device can then receive acoustic-contextual data that is correlated with the first location of the mobile computing device. The acoustic-contextual data can include data associated with one or more transmitting devices, and data associated with an environment proximate the one or more transmitting devices. The mobile computing device can receive one or more signals from at least one of the one or more transmitting devices, and can determine a more accurate second location of the mobile computing device based at least in part on the acoustic-contextual data and the one or more received signals.

20 Claims, 4 Drawing Sheets

(56) References Cited

U.S. PATENT DOCUMENTS

| | | | |
|---|---|---|---|
| 2010/0228482 A1* | 9/2010 | Yonak | G01S 3/8083 |
| | | | 701/301 |
| 2011/0164768 A1* | 7/2011 | Huseth | H04S 7/304 |
| | | | 381/300 |
| 2011/0295590 A1* | 12/2011 | Lloyd | G10L 15/065 |
| | | | 704/8 |
| 2015/0228010 A1 | 8/2015 | Reid et al. | |
| 2017/0019525 A1* | 1/2017 | Hannon | H04M 1/72577 |
| 2017/0103420 A1* | 4/2017 | Ramasarma | G01S 19/39 |
| 2018/0252795 A1* | 9/2018 | Kumar | G01S 5/18 |

* cited by examiner

LOCATION DETERMINATION USING ACOUSTIC-CONTEXTUAL DATA

FIELD

The present disclosure relates generally to real-time locating systems, and more particularly to determining a location of a mobile device based at least in part on acoustic-contextual data associated with a real-time locating system.

BACKGROUND

A common challenge in modern business is to locate important resources at any given time in a building or campus environment. Such resources include key personnel, critical pieces of equipment, vital records and the like. For example, the personnel, the critical pieces of equipment and the vital records are typically mobile, are often needed in a variety of locations during a typical working day, and are therefore constantly being relocated during the working day. Given that it is unproductive to divert other resources to locate these resources, it is desirable to develop an approach that can locate these important resources at any time in the environment of a building, campus environment and the like.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of determining a location of a mobile computing device associated with a real-time locating system. The method includes determining, by a mobile computing device associated with a real-time locating system, a first location of the mobile computing device. The method further includes receiving, by the mobile computing device, acoustic-contextual data associated with the first location of the mobile computing device. The acoustic-contextual data includes data associated with one or more transmitting devices, and data associated with an environment proximate the one or more transmitting devices. The method further includes receiving, by the mobile computing device, one or more signals from at least one of the one or more transmitting devices. The method further includes determining, by the mobile computing device, a second location of the mobile computing device based at least in part on the acoustic-contextual data and the one or more received signals.

BRIEF DESCRIPTION OF THE DRAWINGS

Detailed discussion of embodiments directed to one of ordinary skill in the art is set forth in the specification, which makes reference to the following appended figures.

DETAILED DESCRIPTION

Figure 1:
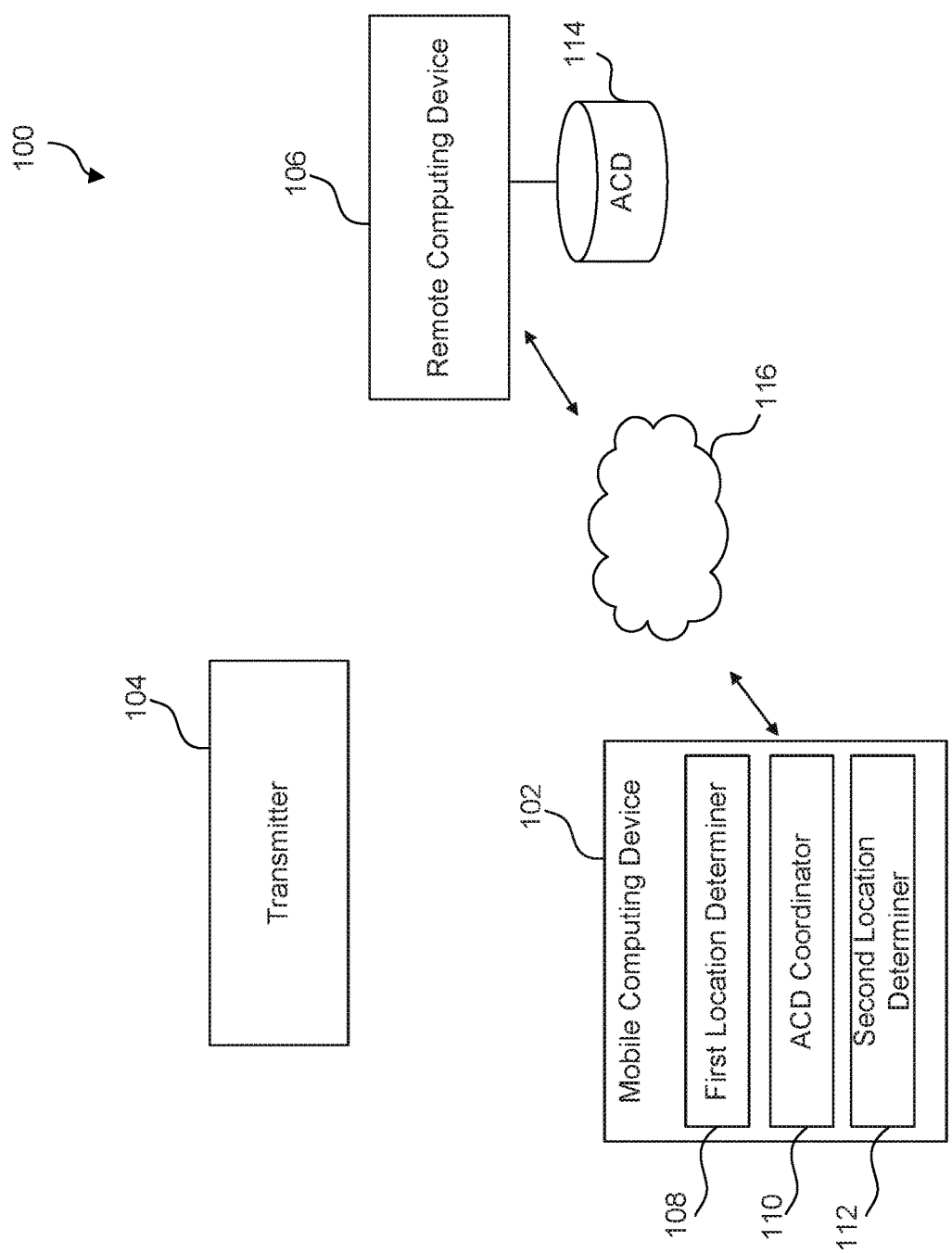
FIG. 1 depicts an overview of an example real-time locating system according to example embodiments of the present disclosure.

Reference will now be made in detail to embodiments, one or more examples of which are illustrated in the drawings. Each example is provided by way of explanation of the embodiments, not limitation of the invention. In fact, it will be apparent to those skilled in the art that various modification and variations can be made to the embodiments without departing from the scope or spirit of the present disclosure. For instance, features illustrated or described as part of one embodiment can be used with another embodiment to yield a still further embodiment. Thus it is intended that aspects of the present disclosure cover such modifications and variations.

Real-time location systems have been developed using various wireless protocols, with perhaps the best known system being the global positioning system (GPS). While such location systems provide horizontal location accuracies of the order of approximately 8 meters, such systems do not address all location scenario requirements. For example, many scenarios demand location accuracies of better than 0.3 meters. Other scenarios require vertical accuracies that distinguish between floors in a high rise building. Still other scenarios require contextual location information, such as room-based information in an office building. Systems, such as indoor positioning systems, have been developed to attempt to address the requirements. However, such conventional indoor positioning systems typically require large deployment efforts and/or infrastructure costs. For instance, such systems may require LIDAR systems that implement full three-dimensional laser mapping of a desired area. As another example, such indoor positioning systems may use ultra-wideband positioning techniques that require large amounts of infrastructure (e.g. transmitting devices, etc.).

In response to these demanding location requirements, embodiments of the present disclosure provide solutions to these requirements. Acoustic signals may be used to determine the location of mobile units, or tags, in three dimensions by transmitting signals from a plurality of transmitting devices (which may be fixed to the walls or ceilings of a building). The acoustic signals may include encoded identifiers of the respective transmitting devices. These acoustic signals can be received by mobile computing devices. If the locations of the static transmitting devices are known, the times of arrival of a set of acoustic signals at one of the mobile computing devices can be used to estimate the location of that mobile device in the environment, using standard geometric calculations.

For example, aspects of the present disclosure are directed to determining a location of a mobile device based on acoustic-contextual data (ACD) associated with a real-time locating system. For instance, a mobile computing device associated with the real-time locating system can determine a first location of the mobile computing device. The first location may be a coarse location determined by a wireless-based location system, such as GPS. In some implementations, the first location can be determined based on a unique identification associated with the real-time locating system. The mobile computing device may then receive acoustic-contextual data associated with the first location. For example, the acoustic-contextual data would be data that is determined to be relevant to the first location. The acoustic-contextual data may include data associated with one or more transmitting devices and/or data associated with one or more acoustic properties of an environment proximate the one or more transmitting devices. The mobile computing device may then receive one or more acoustic signals from at least one of the one or more transmitting devices, and can determine a second location of the mobile computing device based at least in part on the acoustic-contextual data and the one or more received acoustic signals. For example, the second location may be an improved (more precise) location of the mobile computing device compared to the first location. In another example, the second location may be a contextual-based location, such as a room number in an office building, where the mobile computing device is located.

More particularly, the mobile computing device may be, for instance, a mobile user computing device, such as a smartphone, tablet computer, wearable computing device, dedicated tag associated with a real-time locating system, and/or any other suitable mobile computing device capable of being used in mobile operation. The first location can be determined by the mobile computing device based at least in part on a global positioning service (GPS), one or more Wi-Fi signals, one or more Bluetooth signals, one or more cellular signals, one or more positioning sensors implemented within the mobile computing device (e.g. inertial measurement unit(s), gyroscope(s), accelerometer(s), magnetometer(s), etc.), one or more pressure sensors implemented within the mobile computing device, one or more cameras implemented within the mobile computing device, and/or other suitable manner. In some implementations, the first location can be determined based at least in part on an identification of a transmitting device, as encoded within a signal received from the transmitting device by the mobile computing device. For instance, the received signal can indicate a proximity to the transmitting device.

The acoustic-contextual data may be provided to the mobile computing device responsive to a determination of the presence of the mobile computing device at the first location. For instance, upon a determination of the first location, the first location can be correlated with a real-time locating system. More particularly, a real-time locating system located proximate the first location may be identified based at least in part on a known location of the real-time locating system and the determined first location. In this manner, when the first location of the mobile computing device is within a threshold distance from the known location of the real-time locating system, such real-time locating system can be identified using the known first location.

In some implementations, the location of the real-time locating system can be stored in a lookup table or other data arrangement that maps one or more real-time locating systems to respective locations at which the real-time locating systems are deployed. The location can be expressed in the lookup table as any suitable data indicative of one or more locations of the corresponding real-time locating system. For instance, the location(s) can be stored as coordinates (e.g. GPS coordinates), wireless network identifiers (e.g. WLAN service set identifier (SSID), Bluetooth Low Energy (BLE) identification, etc.), acoustic identifier associated with the real-time locating system (e.g. provided by one or more transmitting devices of the real-time locating system), or other suitable location indicators. In some implementations, the location of the real-time locating system can be stored in the lookup table as a geofence or other boundary encompassing an area over which at least a portion of the real-time locating system is deployed.

In this manner, the first location may be determined in accordance with the locations as expressed in the lookup table. For instance, in implementations wherein the location is stored as coordinates, the first location can be determined as coordinates in accordance with the lookup table. As another example, in implementations wherein the location is stored as one or more wireless network identifiers, the first location can be determined based at in part on a detection of wireless network identifiers by the mobile computing device.

The identification of a proximate real-time locating system may be performed by accessing the lookup table and performing a lookup for a table entry of the first location. For instance, in implementations wherein the location of the real-time locating system is stored as GPS coordinates or other data indicative of a physical location, the lookup table can be accessed to determine if the lookup table includes an entry representing a real-time locating system having a location within a threshold distance of the current location of the mobile computing device. As another example, in implementations wherein the location of the real-time locating system is stored as a wireless network identifier, the lookup table can be accessed to determine if the lookup table includes a real-time locating system having a location associated with a wireless network identifier associated with a wireless network proximate the mobile computing device. For instance, if the mobile computing device detects and/or is connected to a wireless network (WLAN, WPAN, etc.), the mobile computing device can access the lookup table to determine if the lookup table includes an entry representing a real-time locating system associated with the identifier of the network.

In some implementations, the identification of a proximate real-time locating system can be performed by the mobile computing device. In such implementations, the lookup table can be stored locally by the mobile computing device. In this manner, the mobile computing device can monitor the location of the mobile computing device, and can access the locally stored lookup table to determine if there is a real-time locating system proximate the mobile computing device.

In some implementations, the lookup table can be stored in a remote computing device, such as a server computing device. In such implementations, the mobile computing device can monitor the location of the mobile computing device, and can provide data indicative of the location to the server device. The server device can then access the lookup table to determine whether there is a real-time locating system proximate the mobile computing device.

As indicated, upon a determination that the mobile computing device is located proximate a real-time locating system, acoustic-contextual data associated with the real-time locating system may be provided to the mobile computing device. The acoustic-contextual data can be stored, for instance, at the server device. For instance, in implementations wherein the proximate real-time locating system is identified by the mobile computing device, the mobile computing device can provide a request for the relevant acoustic-contextual data to the server device. The server device may then provide the relevant acoustic-contextual data to the mobile computing device. In implementations wherein the proximate real-time locating system is identified by the server device, the server device can provide the relevant acoustic-contextual data to the mobile computing device in response to the identification of the proximate real-time locating system by the server device.

The acoustic-contextual data may include suitable data used to facilitate a determination of the second location of the mobile computing device. For instance, the acoustic-contextual data can include data associated with one or more transmitting devices of the real-time locating system and/or data associated with an environment proximate the one or more transmitting devices. The data associated with the one or more transmitting devices can include data descriptive of one or more characteristics of the signals (e.g. acoustic signals) to be transmitted by the transmitting device. Such data can include data indicative of at least one of a sound pressure level, signal coding type, signal identification, signal direction normal, signal spatial distribution, signal period, and/or other suitable data associated with the one or more signals to be transmitted by the transmitting device.

The data associated with the environment proximate the one or more transmitting devices may include data associated with an environment over which the real-time locating system is deployed, such as one or more rooms, spaces, structures, buildings, regions, etc. in which the one or more transmitting devices are located. More particularly, such environmental data may include identifying data associated with the environment. Such identifying data can include unique identifier(s) associated with the location(s) of the one or more transmitting devices, or other suitable identifying data. For instance, the identifier(s) can include identifier(s) indicative of the respective room(s), building(s), campus(es), area(s), etc. in which the one or more transmitting devices are located. The environmental data may further include data specifying an organization, configuration, or hierarchy of the environment in which the one or more transmitting devices are located. For instance, such data can include data specifying a relationship between a particular room and a particular building (e.g. data specifying that the room is located within the building, specifying a location of the room within the building, etc). As another example, such data can include data indicative of an organization of one or more buildings located on a campus. In some implementations, the environmental data can include spatial relationship data specifying a relative physical location between two or more environmental entities (e.g. room, area, campus, wall, object, item, pathway, etc.).

The environmental data may further include dimensional data associated with the environment. For instance, such dimensional data can include the dimensions of one or more reflective surfaces (e.g. walls, ceilings, floors, objects, furniture, etc.) within a room in which a transmitting device is located. The dimensional data may further include data indicative of the normal direction of such reflective surfaces. The environmental data can further include data indicative of the acoustic attenuation of such reflective surfaces at frequencies used in the signal coding scheme. The environmental data may further include data indicative of the relative location(s) of the one or more transmitting devices within a particular room, building, area, etc. More particularly, such environmental data can include an identifier of a surface (e.g. wall, floor, ceiling, etc. of a room) on which a transmitting device is located and/or data indicative of a location and/or orientation of the transmitting device with respect to the surface. The environmental data may further include atmospheric data indicative of the speed of sound, temperature, pressure, humidity, acoustic attenuation, etc. within the environment. In certain embodiments, since the environmental data changes over time, the environmental data may be updated to reflect current environmental conditions.

It will be appreciated that the acoustic-contextual data provided to the mobile computing device may be expressed in any suitable format, structure, organization, configuration, etc. to facilitate a communication of the acoustic-contextual data to the mobile computing device for purpose of determining the second location of the mobile computing device. In addition, it will be further appreciated that the acoustic-contextual data provided to the mobile computing device can include any combination of the data described above for purpose of determining the second location. It will be further still appreciated that the acoustic-contextual data provided to the mobile computing device may include other suitable data associated with the real-time locating system (e.g. one or more transmitting devices) and/or suitable data associated with the environment over which the real-time locating system is deployed without deviating from the scope of the present disclosure.

The acoustic-contextual data that is provided to the mobile computing device may be selected based at least in part on the first location. In some implementations, the acoustic-contextual data for the entire real-time locating system (e.g. for each transmitting device and/or the entire environment over which the real-time locating system is deployed) can be selected. In some implementations, acoustic-contextual data for a subset of the real-time locating system (e.g. a subset of transmitting devices and/or a subset of the environment) can be selected. The subset can be determined based at least in part on the first location. In this manner, the subset can include acoustic-contextual data for a subset of transmitting devices and/or a subset of the environment proximate the first location. In some implementations, the acoustic-contextual data can be selected based at least in part on the known locations of one or more transmitting devices proximate the first location.

Upon receipt of the acoustic-contextual data by the mobile computing device, the mobile computing device may receive acoustic signals (e.g. acoustic signals) from one or more transmitting devices located proximate the mobile computing device. It will be appreciated that the mobile computing device can receive the acoustic signals prior to receipt of the acoustic-contextual data. For instance, in some implementations the mobile computing device can be configured to determine the appropriate acoustic-contextual data based at least in part on an acoustic identifier encoded within the received acoustic signals. More particularly, the transmitting devices of the real-time locating system may be configured to periodically transmit acoustic signals (or other suitable signals, such as radio frequency signals) that can be received by suitable mobile computing devices located within the broadcast range of the transmitting devices. In some implementations, the acoustic signals can be ultrasonic signals having a frequency greater than about 20 kHz. As used herein, the term "about," when used in reference to a numerical value, is intended to refer to within 30% of that value.

In this manner, a mobile computing device located within the broadcast range of one or more transmitting devices can receive acoustic signals from the one or more transmitting devices. The acoustic signals can be signals propagating directly from the one or more transmitting devices to the mobile computing device (referred to herein as "direct signals"), and/or signals that have been reflected by one or more reflective surfaces (referred to herein as "reflected signals"). The reflective surfaces can act as acoustic mirrors capable of reflecting acoustic signals (with some attenuation and a possible phase shift), and can include walls, ceilings, floors, furniture, objects, etc. located within the environment. The second location of the mobile computing device may be determined based at least in part on the acoustic-contextual data and the acoustic signals received from the one or more transmitting devices. The second location can be a more precise location than the first location. For instance, the second location can be a three-dimensional (3D) location specifying an x-coordinate, a y-coordinate, and a z-coordinate with respect to a 3D space. In some implementations, the location can be a two-dimensional location. In still further implementations, contextual location information may be provided, e.g., room number, floor number in an office building.

The mobile computing device may determine the second location based at least in part on the acoustic-contextual data and the received acoustic signals (e.g. direct signals and/or reflected signals). The mobile computing device can be configured to determine the second location using various suitable location determination techniques. For instance, the mobile computing device can be configured to determine the second location using a suitable triangulation, trilateration, multilateration, and/or other suitable technique. In this manner, the mobile computing device can determine various signal measurements associated with the received acoustic signals to facilitate determination of the location of the mobile computing device. Such signal measurements may include a time of arrival, time of flight, angle of arrival, signal strength, and/or time difference of arrival of the received acoustic signals. It will be appreciated that other additional and/or alternative suitable measurements can be used to facilitate determination of the location mobile computing device. For instance, such measurements can include a motion induced frequency shift (e.g. Doppler shift), signal-to-noise ratio, signal phase, and/or other suitable measurements. In addition to the acoustic characteristics of the one or more transmitting devices and environment (e.g. acoustic-contextual data), the mobile computing device may use the acoustic receive characteristics of its one or more acoustic receiver signal chains in the location determination. Such information may include microphone sensitivity, directivity, frequency dependence, and/or other suitable information. This information may be stored on the mobile computing device or retrieved from the server from a database based at least in part on the model type number of the mobile computing device and/or other suitable identifying information associated with the mobile computing device.

More particularly, the mobile computing device may determine the second location based on a knowledge of properties of the acoustic signals transmitted by the transmitting device(s) and the dimensional specifications of the environment in which the transmitting device(s) are located, as provided by the acoustic-contextual data. Such knowledge, in conjunction with the signal measurements of the received acoustic signals, can be used to determine the second location using the various suitable location determination techniques. The acoustic signals can encode identifying data (and/or other data) associated with the respective transmitting devices that transmitted the acoustic signals. In some implementations, upon receiving the acoustic-contextual data and the acoustic signal(s), the mobile computing device can decode the acoustic signal(s) to determine the identification of the transmitting device(s) that transmitted the acoustic signal(s).

In some implementations, the mobile computing device can determine signal paths of the received acoustic signals based at least in part on the acoustic-contextual data, the time of arrival of the received acoustic signal(s), and/or a knowledge of the identity of the transmitting device(s) that transmitted the signal(s). Such signal paths can indicate an estimate of a reflection point of the acoustic signal at which the acoustic signal is reflected off of a reflection surface towards the mobile computing device. The mobile computing device can perform multilateration techniques based at least in part on the signal paths and/or reflection points, and the signal measurements (e.g. time of arrival, etc.) associated with the acoustic signals.

As indicated above, the systems and methods of the present disclosure can provide a more accurate and efficient locating system relative to conventional real-time locating systems (e.g. indoor positioning systems). More particularly, the information gained by the provision of the acoustic-contextual data can be used to increase the accuracy of the determined second location of the mobile computing device. In this manner, the location of the mobile computing device can be determined on a room-by-room basis and/or on a sub-room basis, which can allow for a more accurate and robust location tracking. Such a real-time locating system requires less processing power, and a less complex infrastructure that is smaller and easily scalable. Such real-time locating system further provides near real-time latency by utilizing numerous location determination techniques (e.g. using acoustic signals in conjunction with the acoustic-contextual data). Such a real-time locating system further provides an increased flexibility by allowing the use of various types of mobile computing devices (e.g. smartphones, etc. already owned by a user and/or dedicated positioning tags associated with the real-time locating system).

The systems and methods of the present disclosure may be used in a number of applications, such as location tracking, work flow, mobile equipment tracking, safety and compliance, mobile equipment management, staff location determination, or other suitable application. As a particular example, the systems and methods of the present disclosure can facilitate a provision of wayfinding information, such as routing instructions, step-by-step directions, etc. from an origin to a destination. In some implementations, such wayfinding application can be used in conjunction with a mapping or routing application associated a mobile unit of a user to facilitate the wayfinding with respect to a map of a building, area, geographic region, etc. One example field of use is within the health care industry. For instance, a real-time location system of the present disclosure can be implemented within a hospital to provide patient tracking, patient flow, etc.

With reference now to the figures, example aspects of the present disclosure will be discussed in greater detail. For instance, FIG. 1 depicts an example real-time locating system 100 according to example aspects of the present disclosure. The system 100 includes a mobile computing device 102, a transmitting device 104, and a remote computing device 106. In various implementations, the system 100 can include one or more transmitting devices deployed throughout an environment (e.g. campus, building, room, area, etc.) in such a manner as to facilitate a location determination of one or more mobile computing devices located within the environment. The transmitting devices can be deployed in various suitable arrangements or configurations throughout the environment based on the needs or desires of the user.

The mobile computing device 102 can be configured to receive acoustic signals from the transmitting device 104 when located within a broadcast range of the transmitting device 104. In this manner, the transmitting device 104 may be configured to, at various intervals, (e.g. periodically), transmit acoustic (e.g. ultrasonic) signals that can be received by one or more mobile computing devices (e.g. mobile computing device 102), and used for determining the location of these mobile computing devices.

The mobile computing device 102 includes a first location determiner 108, an ACD coordinator 110, and a second location determiner 112. The first location determiner 108 can be configured to determine a first location of the mobile computing device. The first location determiner 108 may determine the first location based at least in part on GPS, one or more Wi-Fi signals, one or more Bluetooth signals, one or more cellular signals, one or more positioning sensors implemented within the mobile computing device (e.g. inertial measurement unit(s), gyroscope(s), gyroscope(s), accelerometer(s), magnetometer(s), etc.), one or more pressure sensors implemented within the mobile computing device, one or more cameras implemented within the mobile computing device 102, and/or other suitable location determination technique. In this manner, the mobile computing device 102 may include a positioning system configured to leverage various suitable positioning signals (e.g. GPS signals, Wi-Fi signals, Bluetooth signals, cellular signals, sensor signals, etc.) to determine a suitable first location of the mobile computing device 102.

The ACD coordinator 110 may be configured to facilitate the reception of relevant acoustic-contextual data by the mobile computing device 102 based at least in part on the first location. For instance, in some implementations, the ACD coordinator 110 can provide a request to the remote computing device 106 (e.g. via a network 116) for acoustic-contextual data associated with the first location. As indicated above, the acoustic-contextual data may include data associated with one or more transmitting devices and/or the environment proximate the first location. In this manner, the ACD coordinator 110 can, for instance, access a lookup table stored by the mobile computing device 102 to identify a real-time locating system (e.g. real-time locating system 100) proximate the first location. The lookup table may map a plurality of real-time locating systems to a plurality of respective locations. In some implementations, the lookup table can map acoustic-contextual data associated with the respective real-time locating systems to their respective locations. The ACD coordinator 110 can access the lookup table to determine if the first location, as determined by the first location determiner 108, corresponds to, or is located within a threshold distance of a location stored in the lookup table that is mapped to a real-time locating system.

The locations specified in the lookup table can be expressed as any suitable location, as required by the ACD coordinator 110 and/or the lookup table. For instance, the locations may be expressed as GPS coordinates (e.g. latitude, longitude), network identifiers (e.g. Wi-Fi SSID, Bluetooth ID, BLE beacon ID, etc.), and/or other suitable expression. In this manner, the first location determiner 108 may determine the first location in order to identify the locations as expressed in the lookup table. For instance, in implementations wherein the lookup table specifies locations as GPS coordinates, the first location determiner 108 can determine the first location as GPS coordinates using a GPS positioning system associated with the mobile computing device 102. As another example, in implementations wherein the lookup table specifies locations as network identifiers, the first location determiner 108 can determine the location based on a proximity to one or more detected networks (e.g. based on a signal strength of the detected network signals).

In some implementations, the lookup table can be stored at the remote computing device 106. The remote computing device 106 can include one or more computing devices, and can, for instance, be a server, such as a web server. In such implementations, the ACD coordinator 110 can provide the first location to the remote computing device 106, and the remote computing device 106 can access the lookup table to determine if the first location corresponds to a location specified in the lookup table. The remote computing device 106 can then provide the relevant acoustic-contextual data to the mobile computing device 102 based on that location.

In some implementations, the acoustic-contextual data provided to the mobile computing device 102 can be acoustic-contextual data associated with the entire real-time locating system corresponding to the first location. In other implementations, the acoustic-contextual data provided to the mobile computing device 102 can be acoustic-contextual data associated with a subset of the real-time locating system. For instance, such subset of the real-time locating system can correspond to a particular room, area, space, building, campus, etc. over which the real-time locating system is deployed. In this manner, the acoustic-contextual data associated with the subset can be acoustic-contextual data specific to the particular room, area, space, building, campus, etc. The subset can be determined based on a proximity to the first location. For instance, if is determined that the first location is a location within (or proximate) a particular room or area, acoustic-contextual data for the room or area can be provided to the mobile computing device 102. In some implementations, the acoustic-contextual data can be associated with one or more transmitting devices. For instance, in such implementations, each transmitting device associated with the real-time locating system can have an associated set of acoustic-contextual data tailored to that transmitting device and/or the environment in which the transmitting device is located. In this manner, the lookup table can map various locations to various transmitting devices, and the selected acoustic-contextual data can be selected based at least in part on an association with such various transmitting devices.

The acoustic-contextual data may include data descriptive of characteristics of the acoustic signals, such as data indicative of at least one of a sound pressure level, signal coding type, signal identification, signal direction normal, signal spatial distribution, signal period, carrier frequency, and/or other suitable data associated with the one or more signals to be transmitted by the transmitting device. The acoustic-contextual data may further include data associated with an environment in which the real-time locating system is located. Such environmental data can include a layout or organizational hierarchy of the environment, identifying data of the location within the environment (e.g. room, area, space, region, building, etc.) in which the transmitting device 104 is located, dimensional specifications of one or more reflective surfaces (e.g. walls, ceilings, floors, objects, etc.) within the environment (e.g. within a room, area, region, etc. in which the transmitting device 104 is located), data indicative of the relative location of the transmitting device 104 within the environment, such as an identifier of the surface on which the transmitting device 104 is located and/or a location and/or orientation of the transmitting device 104 with respect to the surface. The environmental data may further include atmospheric data indicative of the speed of sound, temperature, pressure, humidity, etc. within the environment. In certain embodiments, since the environmental data changes over time, the environmental data may be updated to reflect current environmental conditions.

As indicated, the mobile computing device 102 can further receive acoustic signals from the transmitting device 104. The second location determiner 112 may then determine a second location of the mobile computing device 102 based at least in part on the received acoustic signals and the acoustic-contextual data. More particularly, the second location determiner 112 may use knowledge of the properties of the acoustic signals and of the environment in which the mobile computing device 102 is located, as specified in the acoustic-contextual data, to aid in the determination of the second location of the mobile computing device 102. The second location may be a 3D location specifying coordinates along an x-axis, a y-axis, and a z-axis.

The second location determiner 112 may be configured to determine the location of the mobile computing device 102 using various suitable location determination techniques. More particularly, the second location determiner 112 may be configured to determine the second location using triangulation, trilateration, multilateration, and/or other suitable techniques. In this manner, the second location determiner 112 may determine various signal measurements associated with the received acoustic signals to facilitate determination of the location of the mobile computing device. Such signal measurements may include a time of arrival, time of flight, angle of arrival, signal strength, and/or time difference of arrival of the received acoustic signals. The second location determiner 112 may further use the received acoustic-contextual data to determine the second location of the mobile computing device 102. As indicated, the acoustic-contextual data may include data indicative of a plurality of signal characteristics or properties of the acoustic signals transmitted by the transmitting device 104, as well as a plurality of characteristics or properties of the environment in which the transmitting device 104 is located. The second location determiner 112 may use the knowledge of the signal characteristics and the knowledge of the environmental characteristics to aid in the location determination. For instance, in some implementations, the second location determiner 112 can determine one or more reflection points on one or more reflective surfaces of the environment based at least in part on the acoustic-contextual data and the received acoustic signals. As indicated, the reflection points can be locations on the reflective surfaces wherein the acoustic signals were reflected towards the mobile computing device. The second location determiner 112 may treat one or more of the reflection points as "virtual transmitters" for use in, for instance, a multilateration technique. In this manner, such multilateration technique may be performed based on a knowledge of the timing of the receipt of the acoustic signals in addition to a knowledge of the signal paths of the acoustic signals within the environment.

In some implementations, the second location determiner 112 can determine the second location based at least in part on one or more position sensors associated with the mobile computing device 102. Such position sensors can include one or more gyroscopes, accelerometers, magnetometers, inertial measurement units, etc. In such implementations, the second location can include an orientation and/or direction of the mobile computing device 102. In this manner, the second location may be determined using suitable sensor fusion techniques. In some implementations, the second location determiner 112 can determine the second location based at least in part on known characteristics or other information associated with one or more acoustic receivers associated with the mobile computing device 102. For instance, these characteristics and/or other information can include microphone sensitivity, directivity, frequency dependence, etc.

The real-time locating system 100 depicted in FIG. 1 is intended for illustrative purposes only. It will be appreciated that various other suitable real-time locating system configurations can be used without deviating from the scope of the present disclosure. For instance, although the system 100 depicted in FIG. 1 depicts only one mobile computing device 102 and one transmitting device 104, suitable real-time locating systems in accordance with the present disclosure can include multiple transmitting devices and mobile computing devices. As another example, suitable real-time locating systems in accordance with the present disclosure can include various other suitable structures, components and/or computing devices to facilitate the determination of a location of one or more mobile computing devices. As yet another example, in some implementations, the acoustic-contextual data 114 can be stored at the mobile computing device. In such implementations, the mobile computing device may be configured to determine the second location without the need for communication with the remote computing device 106.

Figure 2:
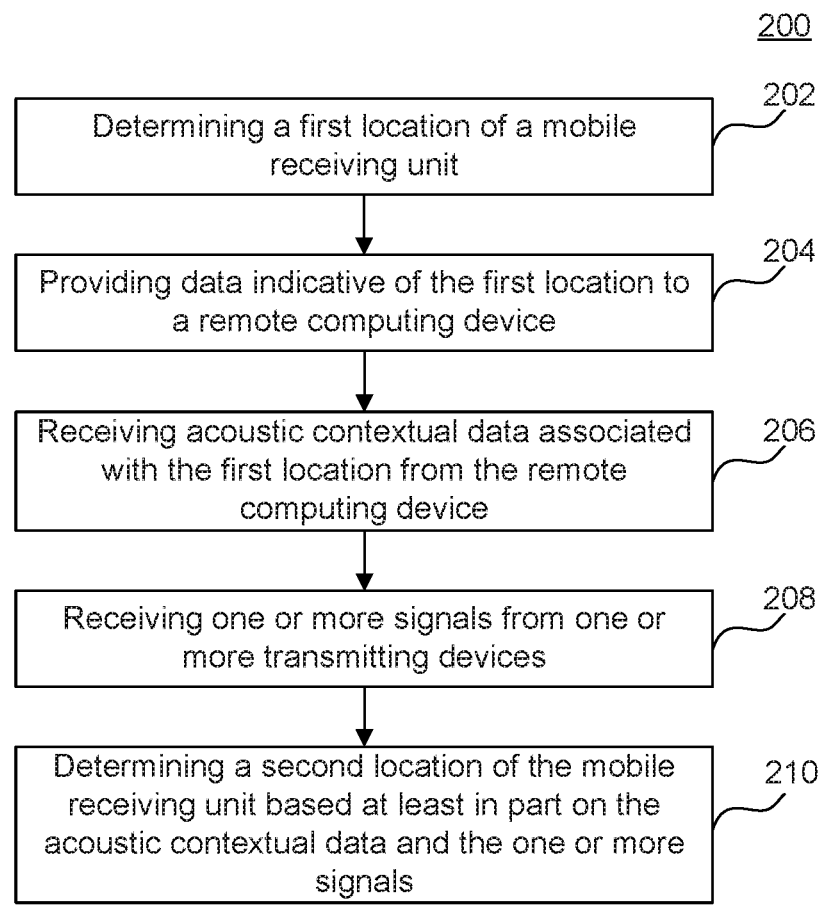
FIG. 2 depicts a flow diagram of an example method of determining a location of a mobile computing device associated with a real-time locating system according to example embodiments of the present disclosure.

FIG. 2 depicts a flow diagram of an example method (200) of determining a location of a mobile computing device according to example aspects of the present disclosure. The method (200) can be implemented by one or more computing devices, such as one or more of the computing devices described with respect to FIG. 4. In some implementations, the method (200) can be implemented by the first location determiner 108, the ACD coordinator 110, and/or the second location determiner 112 of FIG. 1. In addition, FIG. 2 depicts steps performed in a particular order for purposes of illustration and discussion. Those of ordinary skill in the art, using the disclosures provided herein, will understand that the steps of any of the methods described herein can be adapted, rearranged, expanded, omitted, or modified in various ways without deviating from the scope of the present disclosure.

At (202), the method (200) can include determining a first location of a mobile computing device. The mobile computing device can be a user device, such as a smartphone, tablet computing device, laptop computing device, wearable computing device, dedicated positioning tag (e.g. active or passive) associated with a real-time locating system, or other suitable mobile computing device capable of being used in mobile operation. The first location may be determined by the mobile computing device based at least in part on a global positioning service (GPS), one or more Wi-Fi signals, one or more Bluetooth signals, one or more cellular signals, one or more positioning sensors implemented within the mobile computing device (e.g. inertial measurement unit(s), gyroscope(s), accelerometer(s), magnetometer(s), etc.), one or more pressure sensors implemented within the mobile computing device, one or more cameras implemented within the mobile computing device, and/or other suitable location determination technique.

In some implementations, the first location can be determined to comply with requirements of a real-time locating system of the present disclosure. For instance, the first location can be a location that indicates proximity to the real-time locating system. More particularly, the first location may be expressed as coordinates (e.g. GPS coordinates), as one or more network identifiers (e.g. Wi-Fi SSID, BLE beacon identifier, Bluetooth network identifier, Zigbee network identifier, etc.) detected by the mobile computing device, or other suitable location indicator. In this manner, determining the first location may include determining a location configured to facilitate a provision of relevant acoustic-contextual data to the mobile computing device. As will be described in greater detail below, the first location may be expressed in a format, type, etc. that is compatible with a lookup table associated with the real-time locating system. The lookup table can map or correlate a plurality of locations with real-time locating systems.

At (204), the method (200) can include providing data indicative of the first location to a remote computing device. The remote computing device may be a server computing device associated with the real-time locating system. In various implementations, the server may be located at the real-time locating system and/or at a central location remote from the real-time locating system. The mobile computing device and the remote computing device may communicate via a suitable network. As indicated, the data indicative of the first location may be data expressed in accordance with a lookup table stored at the server that maps locations to real-time locating system(s). In this manner, the lookup table may map coordinates, network identifiers, and/or other location indicators to one or more real-time locating systems. In some implementations, one or more locations in the lookup table can be expressed as geofences or other data defining boundaries or perimeters surrounding an area or region. For instance, in such implementations, the mobile computing device can be configured detect a presence of the mobile computing device within the geofence, and can provide an indication of such presence to the remote computing device. As another example, in some implementations wherein the lookup table specifies locations as geofences, the mobile computing device can provide location data to the remote computing device (e.g. GPS coordinates), to facilitate a detection of the presence of the mobile computing device within the geofence by the remote computing device. In some implementations, the lookup table can map a location to a subset of the environment over which a real-time locating system is deployed. For instance, the subset can include one or more buildings, rooms, areas, regions, transmitting devices, etc, located within the environment associated with the real-time locating system.

At (206), the method (200) can include receiving acoustic-contextual data associated with the first location from the remote computing device. For instance, upon receiving the data indicative of the first location from the mobile computing device, the remote computing device can determine whether the mobile computing device is located proximate a real-time locating system. In this manner, the remote computing device may access the lookup table and perform a lookup of the first location to determine if the first location corresponds to (or is located within a threshold distance of) a location included in the lookup table. If the first location does correspond to such a location, the remote computing device may provide acoustic-contextual data to the mobile computing device. For instance, in implementations wherein the lookup table specifies locations as geofences, the remote computing device can be configured to detect whether the first location corresponds to a location included in the lookup table based on a detected presence of the mobile computing device within a geofence associated with the lookup table.

As indicated, the acoustic-contextual data may include data descriptive of the signals transmitted by one or more acoustic transmitters associated with the first location. Such data descriptive of the signals may include data indicative of at least one of a sound pressure level, signal coding type, signal identification, signal direction normal, signal spatial distribution, signal period, and/or other suitable data associated with the signals to be transmitted by the transmitting device. The acoustic-contextual data may further include data descriptive of an environment proximate the first location. Such environmental data may include identifying data associated with the environment. Such identifying data may include one or more identifiers associated with the environment in which the one or more transmitting devices are located, or other suitable identifying data. More particularly, the identifier(s) may be associated with one or more rooms, areas, spaces, buildings, etc. in which the one or more transmitting devices are located. The environmental data may further include data indicative of a layout or organization of the environment, dimensional data associated with the environment (e.g. dimensions and normals of one or more reflective surfaces within a particular room), data indicative of the acoustic attenuation of one or more reflective surfaces within the environment at the frequencies used in the signal coding scheme, data indicative of the relative location(s) of the one or more transmitting devices within the environment, atmospheric data indicative of the speed of sound, acoustic attenuation, temperature, pressure, humidity, etc. within the environment, and/or other suitable data.

At (208), the method (200) can include receiving one or more signals from one or more transmitting devices associated with the real-time locating system. As indicated, the real-time locating system can include one or more transmitting devices deployed throughout the environment, More particularly, the one or more transmitting devices may be deployed in such a manner as to facilitate a location determination of one or more mobile computing devices in one or more desired areas, rooms, buildings, etc. throughout the environment. The one or more signals can be acoustic signals transmitted by one or more transducers associated with the one or more transmitting devices. In some implementations, the one or more signals can be ultrasonic signals. The transmitting device(s) can transmit the acoustic signals, for instance, periodically, such that the acoustic signals can be received by one or more mobile computing devices located within the broadcast range of the respective transmitting device(s).

At (210), the method (200) can include determining a second location of the mobile computing device based at least in part on the acoustic-contextual data and the one or more received acoustic signals. In some implementations, the second location can be a 3D location specifying an x-coordinate, a y-coordinate, and a z-coordinate with respect to a 3D space. The second location may be determined by leveraging the acoustic-contextual data in conjunction with the received acoustic signals to determine more precise (e.g. relative to the first location) location of the mobile computing device. For instance, in some implementations, the second location can be accurate to within about 12 inches to about 24 inches. More particularly, the mobile computing device may utilize a knowledge of the location(s) of the transmitting device(s), the signal properties, and/or the environmental properties (e.g. dimensional specifications, atmospherics data, etc.) as provided by the acoustic-contextual data, and the received signals to determine the second location. The acoustic-contextual data may be utilized to aid in a location determination technique, such as multilateration, trilateration, triangulation, and/or other suitable technique. As indicated, such location determination techniques may be performed at least in part using time of arrival, time of flight, angle of arrival, signal strength, time difference of arrival, and/or other suitable metric associated with the received acoustic signals. In some implementations, the second location may be determined based at least in part on known characteristics or other suitable information associated with one or more acoustic receivers associated with the mobile computing device 102. For instance, these characteristics and/or other information can include microphone sensitivity, directivity, frequency dependence, etc.

Figure 3:
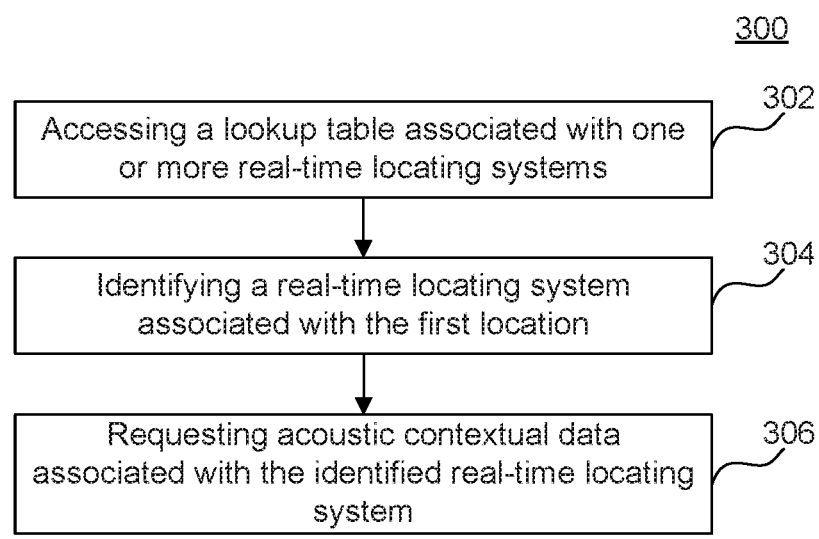
FIG. 3 depicts a flow diagram of an example method of requesting acoustic-contextual data associated with a real-time locating system according to example embodiments of the present disclosure.

In some implementations, the lookup table mapping various locations to real-time locating system(s) may be stored by the mobile computing device. For instance, FIG. 3 depicts a flow diagram of an example method (300) of receiving acoustic-contextual data according to example aspects of the present disclosure. The method (300) can be implemented by one or more computing devices, such as one or more of the computing devices described with respect to FIG. 5. In some implementations, the method (300) can be implemented by the ACD coordinator 110, of FIG. 1. In addition, FIG. 3 depicts steps performed in a particular order for purposes of illustration and discussion.

At (302), the method (300) can include accessing a lookup table associated with one or more real-time locating systems. As indicated, the lookup table may be stored by a mobile computing device associated with a real-time locating system. The lookup table may map locations with real-time locating systems. In some implementations, the lookup table can map locations to one or more subsets of an environment in which a real-time locating system is deployed. In this manner, the lookup table may correlate a location as indicated by GPS coordinates, network signals, etc. with a relative location within an environment (e.g. a particular room, building, area, region, etc. within the environment). In some implementations, the lookup table can map various locations to one or more transmitting devices associated with a real-time locating system.

At (304), the method (300) can include identifying a real-time locating system associated with the first location based at least in part on the accessed lookup table. More particularly, the mobile computing device, having accessed the lookup table, may perform a lookup of the first location of the mobile computing device (e.g. as determined in (202) of the method (200)) to identify a real-time locating system associated with the first location, as specified by the lookup table. In some implementations, identifying a real-time locating system can include identifying a relative location within an environment in which the real-time locating system is deployed. In some implementations, identifying a real-time locating system can include identifying one or more transmitting devices of the real-time locating system that are associated with the first location, as specified by the lookup table.

At (306), the method (300) can include requesting acoustic-contextual data associated with the identified real-time locating system, the identified relative location within the environment, and/or the one or more identified transmitting devices associated with the real-time locating system. More particularly, requesting acoustic-contextual data may include providing, via a network, a request to a remote computing device (e.g. a server device) for acoustic-contextual data associated with the identified real-time locating system, the identified relative location, and/or the one or more identified transmitting devices. In some implementations, the request can include a request for specific acoustic-contextual data from the remote computing device. Upon receiving such request, the remote computing device may provide the requested acoustic-contextual data to the mobile computing device. In various implementations, upon receiving the requested acoustic-contextual data from the remote computing device, the mobile computing device can determine a second location of the mobile computing device. For instance, such location determination can be performed in accordance with (208)-(210) of the method (200).

Figure 4:
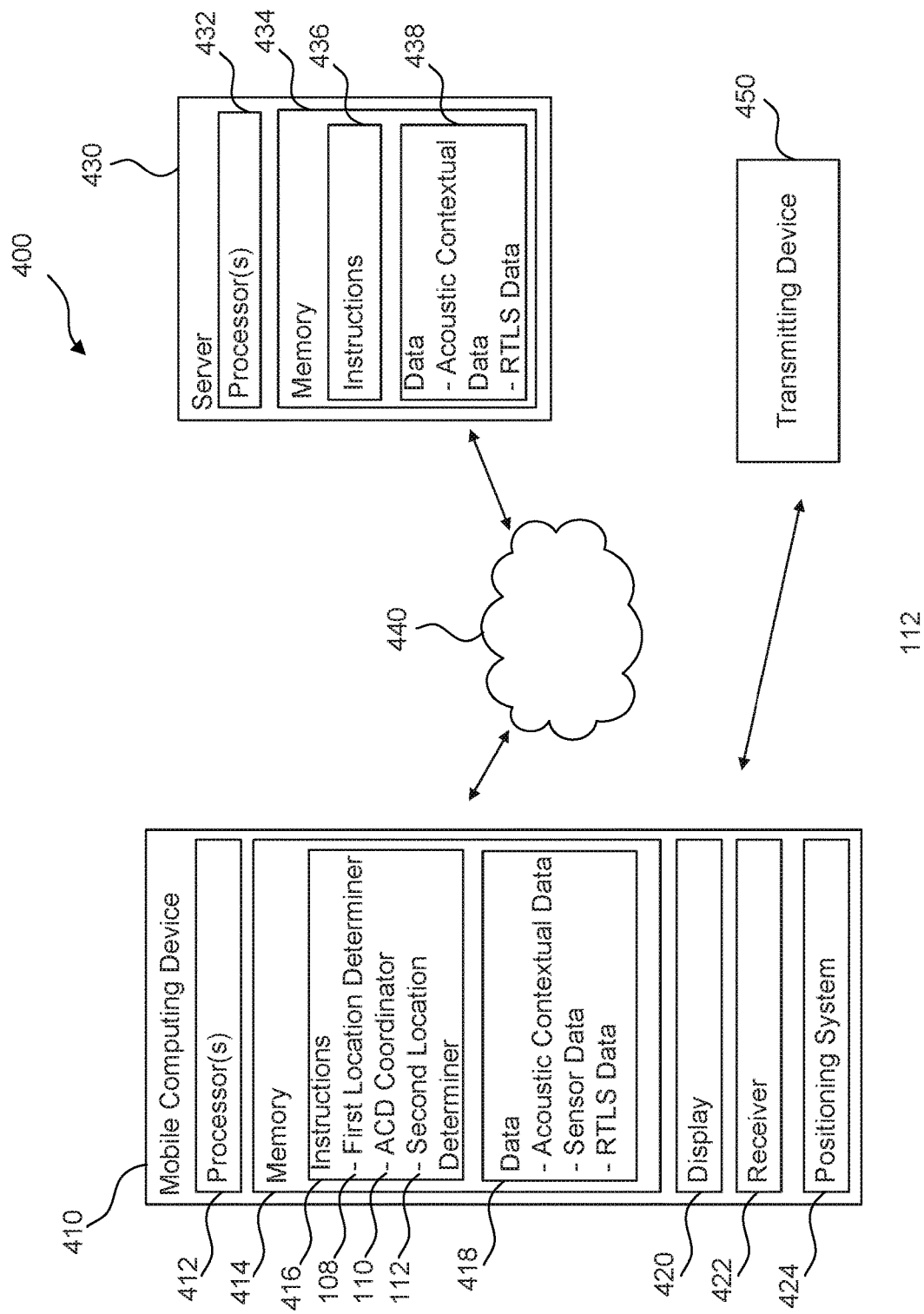
FIG. 4 depicts an example system according to example embodiments of the present disclosure.

FIG. 4 depicts an example system 400 that can be used to implement the methods and systems of the present disclosure. In some implementations, the system 400 can be at least a portion of a real-time locating system configured to determine the locations of various suitable mobile computing devices. The system 400 may be implemented using a client-server architecture that includes a mobile computing device 410 that communicates with one or more remote computing devices, such as server 430. The system 400 can be implemented using other suitable architectures.

As shown, the system 400 can include a mobile computing device 410. The mobile computing device 410 can be any suitable type of mobile computing device, such as a smartphone, tablet, cellular telephone, wearable computing device, or any other suitable mobile computing device capable of being used in mobile operation. In some implementations, the mobile computing device can be a dedicated tag (e.g. passive or active) or other device for use in the real-time locating system. The mobile computing device 410 can include one or more processor(s) 412 and one or more memory devices 414.

The one or more processor(s) 412 can include any suitable processing device, such as a microprocessor, microcontroller, integrated circuit, logic device, one or more central processing units (CPUs), graphics processing units (GPUs) dedicated to efficiently rendering images or performing other specialized calculations, and/or other processing devices, such as a system on a chip (SoC) or a SoC with an integrated. RF transceiver. The one or more memory devices 414 can include one or more computer-readable media, including, but not limited to, non-transitory computer-readable media, RAM, ROM, hard drives, flash memory, or other memory devices.

The one or more memory devices 414 can store information accessible by the one or more processors 412, including instructions 416 that can be executed by the one or more processors 412. For instance, the memory devices 414 can store the instructions 416 for implementing one or more modules configured to implement a first location determiner 108, an ACD coordinator 110, and/or a second location determiner 112, and/or other suitable instructions.

Each of the first location determiner 108, ACD coordinator 110, and second location determiner 112 may include computer logic utilized to provide desired functionality. Thus, each of the first location determiner 108, ACD coordinator 110, and second location determiner 112 can be implemented in hardware, application specific circuits, firmware and/or software controlling a general purpose processor. In one embodiment, each of the first location determiner 108, ACD coordinator 110, and second location determiner 112 are program code files stored on the storage device, loaded into memory and executed by a processor or can be provided from computer program products, for example computer executable instructions, that are stored in a tangible computer-readable storage medium such as RAM, hard disk or optical or magnetic media. The first location determiner 108, ACD coordinator 110, and second location determiner 112 can each correspond to one or more different programs, files, circuits, or sets of instructions. Likewise, two or more of the first location determiner 108, ACD coordinator 110, and second location determiner 112 can be combined into a single program, file, circuit, or set of instructions.

The instructions 416 may further include instructions for implementing a browser, for running a specialized application, or for performing other functions on the mobile computing device 410. For instance, the specialized application can be used to exchange data with server 430 over the network 440. The instructions 416 can include client-device-readable code for providing and implementing aspects of the present disclosure. For example, the instructions 416 can include instructions for implementing an application associated with the real-time locating system, or a third party application implementing wayfinding, asset tracking, or other services on the mobile computing device 410.

The one or more memory devices 414 can also include data 418 that can be retrieved, manipulated, created, or stored by the one or more processors 412. The data 418 may include, for instance, acoustic-contextual data, sensor data, and/or other data.

The mobile computing device 410 may include various input/output devices for providing and receiving information from a user, such as a touch screen, touch pad, data entry keys, speakers, and/or a microphone suitable for voice recognition. For instance, the mobile computing device 410 can have a display 420 for presenting a user interface to a user.

The mobile computing device 410 can further include a positioning system 424. The positioning system 424 can be any device or circuitry for determining the position of remote computing device. For example, the positioning device can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers, Bluetooth hotspots, BLE beacons, Wi-Fi access points or Wi-Fi hotspots, Wi-Fi time-of-flight, and/or other suitable techniques for determining position.

The mobile computing device 410 may also include a network interface used to communicate with one or more remote computing devices (e.g. server 430) over a network 440. The network interface can include any suitable components for interfacing with one more networks, including for example, transmitters, receivers, ports, controllers, antennas, or other suitable components.

The mobile computing device 410 may further include a communication system used to communicate with one or more transmitting devices, such as transmitting device 450. The communication system can include, for instance, one or more transducers (e.g. microphone devices) configured to receive acoustic (e.g. ultrasonic) signals from the transmitting device 450.

In some implementations, the mobile computing device 410 can be in communication with a remote computing device, such as a server 430 over network 440. Server 430 can include one or more computing devices. The server 430 can include one or more computing devices, and can be implemented, for instance, as a parallel or distributed computing system. In particular, multiple computing devices can act together as a single server 430.

Similar to the mobile computing device 410, the server 430 can include one or more processor(s) 432 and a memory 434. The one or more processor(s) 432 can include one or more central processing units (CPUs), and/or other processing devices. The memory 434 can include one or more computer-readable media and can store information accessible by the one or more processors 432, including instructions 436 that can be executed by the one or more processors 432, and data 438. For instance, although the second location determiner 112 is depicted in FIG. 4 as being included in the mobile computing device 102, in other implementations, the second location determiner 112 can be included in the server 430.

The data 438 may be stored in one or more databases. The one or more databases can be connected to the server 430 by a high bandwidth LAN or WAN, or can also be connected to server 430 through network 440. The one or more databases may be split up so that they are located in multiple locales.

Server 430 may also include a network interface used to communicate with computing device 410 over network 440. The network interface can include any suitable components for interfacing with one more networks, including for example, transmitters, receivers, ports, controllers, antennas, or other suitable components.

Network 440 can be any type of communications network, such as a local area network (e.g. intranet), wide area network (e.g. Internet), cellular network, or some combination thereof. Network 440 may also include a direct connection between the mobile computing device 410 and server 430. Network 440 can include any number of wired or wireless links and can be carried out using any suitable communication protocol.

The system 400 can further include one or more transmitting devices, such as transmitting device 450. The transmitting device 450 can transmit acoustic signals (e.g. ultrasonic signals) such as described with regard to transmitting device 104 in FIG. 1. In some implementations, the transmitting device 450 can transmit other suitable signals, such as radio frequency signals. The transmitting device 450 can be implemented using any suitable computing device(s). Although only one transmitting device is depicted in FIG. 4, it will be appreciated by those skilled in the art that any suitable number of transmitting devices can be included in the system 400.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject flatter as would be readily apparent to one of ordinary skill in the art.

What is claimed is:

1. A computer-implemented method of determining a location of a mobile computing device, the method comprising:
   determining, by a mobile computing device, a first location of the mobile computing device;
   responsive to determining the first location, requesting, by the mobile computing device, acoustic-contextual data from a real-time locating system, the acoustic-contextual data associated with the first location of the mobile computing device, the acoustic-contextual data comprising first data associated with one or more transmitting devices associated with the real-time locating system, and second data associated with an environment proximate the one or more transmitting devices;

receiving, by the mobile computing device, the requested acoustic-contextual data from the real-time locating system, the acoustic-contextual data being transmitted via a network associated with the real-time locating system;

receiving, by the mobile computing device, one or more acoustic signals from at least one of the one or more transmitting devices; and determining, by the mobile computing device, a second location of the mobile computing device based at least in part on the acoustic-contextual data and the one or more received acoustic signals.

2. The computer-implemented method of claim 1, wherein determining the first location of the mobile computing device comprises:

determining the first location based at least in part on data associated with one or more positioning systems associated with the mobile computing device, wherein an accuracy of the second location of the mobile computing device exceeds an accuracy of the first location of the mobile computing device.

3. The computer-implemented method of claim 1, wherein requesting the acoustic-contextual data further includes:

providing, by the mobile computing device, third data indicative of the first location of the mobile computing device to a remote computing device associated with the real-time locating system.

4. The computer-implemented method of claim 1, further comprising:

identifying, by the mobile computing device, the real-time locating system; and wherein requesting the acoustic-contextual data comprises requesting the acoustic-contextual data from a remote computing device associated with the identified real-time locating system.

5. The computer-implemented method of claim 4, further comprising accessing, by the mobile computing device, a lookup table correlating a plurality of locations to one or more real-time locating systems that include the identified real-time locating system; and wherein identifying, by the mobile computing device, the real-time locating system comprises identifying the real-time locating system based at least in part on the lookup table and the first location.

6. The computer-implemented method of claim 1, wherein the first data associated with the one or more transmitting devices comprises data associated with one or more acoustic signals transmitted by the one or more transmitting devices.

7. The computer-implemented method of claim 6, wherein the data associated with the one or more acoustic signals comprises data indicative of at least one of a sound pressure level, signal coding type, signal identification, signal direction normal, signal spatial distribution, and signal period associated with the one or more acoustic signals.

8. The computer-implemented method of claim 7, wherein the second data associated with the environment proximate the one or more transmitting devices comprises identifying information associated with the environment, location data associated with the one or more transmitting devices relative to the environment, data associated with one or more reflective surfaces within the environment, or atmospheric data associated with the environment.

9. The computer-implemented method of claim 8, wherein the data associated with the one or more reflective surfaces comprises data indicative of the respective dimensions, normals, and acoustic attenuations of the one or more reflective surfaces.

10. The computer-implemented method of claim 8, wherein the atmospheric data comprises data indicative of at least one of the speed of sound, acoustic attenuation, temperature, pressure, and humidity of the environment.

11. The computer-implemented method of claim 1, wherein the mobile computing device is a smartphone.

12. The computer-implemented method of claim 1, wherein the one or more acoustic signals are ultrasonic signals.

13. The computer-implemented method of claim 1, wherein the acoustic-contextual data is provided to the mobile computing device by a remote server computing device associated with the real-time locating system.

14. A computing system comprising:

one or more processors;

one or more memory devices, the one or more memory devices storing computer-readable instructions that when executed by the one or more processors cause the one or more processors to perform operations, the operations comprising:

determining a first location of a mobile computing device;

responsive to determining the first location, requesting acoustic-contextual data from a real-time locating system, the acoustic-contextual data associated with the first location of the mobile computing device, the acoustic-contextual data comprising first data associated with one or more transmitting devices of the real-time locating system, and second data associated with an environment proximate the one or more transmitting devices;

receiving the requested acoustic-contextual data from the real-time locating system, the acoustic-contextual data being transmitted via a network associated with the real-time locating system;

receiving one or more acoustic signals from at least one of the one or more transmitting devices; and determining a second location of the mobile computing device based at least in part on the acoustic-contextual data and the one or more received acoustic signals.

15. The computing system of claim 14, wherein the first data associated with the one or more transmitting devices comprises data associated with one or more acoustic signals to be transmitted by the one or more transmitting devices.

16. The computing system of claim 15, wherein the data associated with the one or more acoustic signals comprises data indicative of at least one of a sound pressure level, signal coding type, signal identification, signal direction normal, signal spatial distribution, and signal period associated with the one or more acoustic signals.

17. The computing system of claim 16, wherein the second data associated with the environment proximate the one or more transmitting devices comprises dimensional specifications associated with the environment, identifying information associated with the environment, location data associated with the one or more transmitting devices relative to the environment, data associated with one or more reflective surfaces within the environment, or atmospheric data associated with the environment.

18. The computing system of claim 17, wherein:

the data associated with the one or more reflective surfaces comprises data indicative of the respective dimensions, normals, and acoustic attenuations of the one or more reflective surfaces; and the atmospheric data comprises data indicative of the speed of sound, temperature, pressure, and humidity of the environment.

19. One or more tangible, non-transitory computer-readable media storing computer-readable instructions that when executed by one or more processors cause the one or more processors to perform operations, the operations comprising:

determining a first location of a mobile computing device;

responsive to determining the first location, requesting acoustic-contextual data from a real-time locating system, the acoustic-contextual data associated with the first location of the mobile computing device, the acoustic-contextual data comprising first data associated with one or more transmitting devices of the real-time locating system, and second data associated with an environment proximate the one or more transmitting devices;

receiving the requested acoustic-contextual data from the real-time locating system, the acoustic-contextual data being transmitted via a network associated with the real-time locating system;

receiving one or more acoustic signals from at least one of the one or more transmitting devices; and determining a second location of the mobile computing device based at least in part on the acoustic-contextual data and the one or more received acoustic signals.

20. A system for determining a location of a mobile computing device associated with a real-time locating system, the system comprising:

a first location determiner configured to determine a first location of a mobile computing device;

means for, responsive to determining the first location, requesting acoustic-contextual data from a real-time locating system, the acoustic-contextual data associated with the first location of the mobile computing device, the acoustic-contextual data comprising first data associated with one or more transmitting devices of the real-time locating system, and second data associated with an environment proximate the one or more transmitting devices;

means for receiving the requested acoustic-contextual data from the real-time locating system, the acoustic-contextual data being transmitted via a network associated with the real-time locating system;

means for receiving one or more acoustic signals from at least one of the one or more transmitting devices; and a second location determiner configured to determine a second location of the mobile computing device based at least in part on the acoustic-contextual data and the one or more received acoustic signals.

* * * * *